United States Patent [19]

Hamilton et al.

[11] B 3,915,235

[45] Oct. 28, 1975

[54] BURSTING DISC ASSEMBLY

[75] Inventors: John Hamilton; Leslie Ernest Medlock, both of Stevenston, Scotland

[73] Assignee: Imperial Chemical Industries Limited, London, England

[22] Filed: May 11, 1973

[21] Appl. No.: 359,540

[44] Published under the Trial Voluntary Protest Program on January 28, 1975 as document no. B 359,540.

[30] Foreign Application Priority Data
May 22, 1972  United Kingdom............... 23884/72

[52] U.S. Cl. ..................... 169/28; 137/68; 137/797
[51] Int. Cl.² .................... A62C 35/08; F16K 13/06
[58] Field of Search ............................... 137/68–71, 137/797; 169/19, 28, 26, 37, 41

[56]  References Cited
UNITED STATES PATENTS

| | | | |
|---|---|---|---|
| 1,933,694 | 11/1933 | Allen et al. ...................... | 169/26 X |
| 2,780,389 | 2/1957 | Sandgren ....................... | 137/68 UX |
| 3,288,992 | 11/1966 | Matsudaira et al. .............. | 137/68 X |
| 3,494,370 | 2/1970 | Wahl et al. ..................... | 137/68 |
| 3,633,596 | 1/1972 | Gerber.................................. | 137/68 |
| 3,726,344 | 4/1973 | Rothman et al. .................. | 169/19 X |
| 3,731,948 | 5/1973 | Risko................................... | 137/68 X |

FOREIGN PATENTS OR APPLICATIONS

| | | | |
|---|---|---|---|
| 567,120 | 1/1945 | United Kingdom................... | 137/71 |
| 693,636 | 7/1953 | United Kingdom................... | 137/71 |
| 825,245 | 11/1937 | France................................. | 169/26 |

OTHER PUBLICATIONS
Encyclopaedia Britannica, (1957 Edition), Vol. 10, Title Page Front and Back)and and p. 407.

*Primary Examiner*—Robert S. Ward, Jr.
*Attorney, Agent, or Firm*—Cushman, Darby & Cushman

[57]  ABSTRACT

A frangible disc assembly for use in fire fighting and safety devices wherein a frangible disc of toughened glass is shattered by a metal spike projected by pressurized gas, generated, for example, by a fast-burning gas-producing pyrotechnic composition.

8 Claims, 3 Drawing Figures

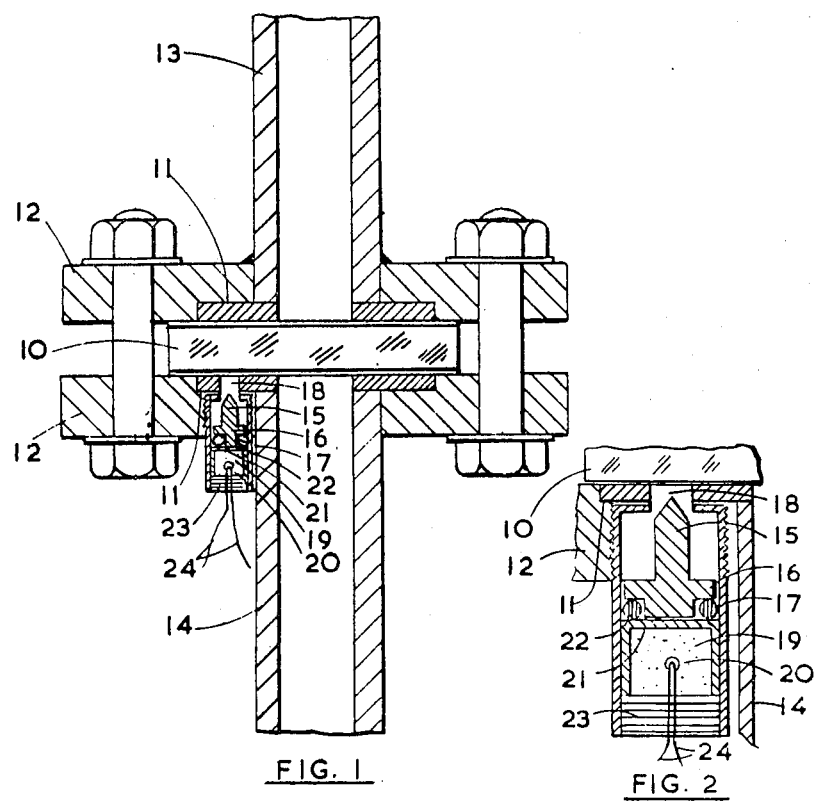
FIG. 1
FIG. 2
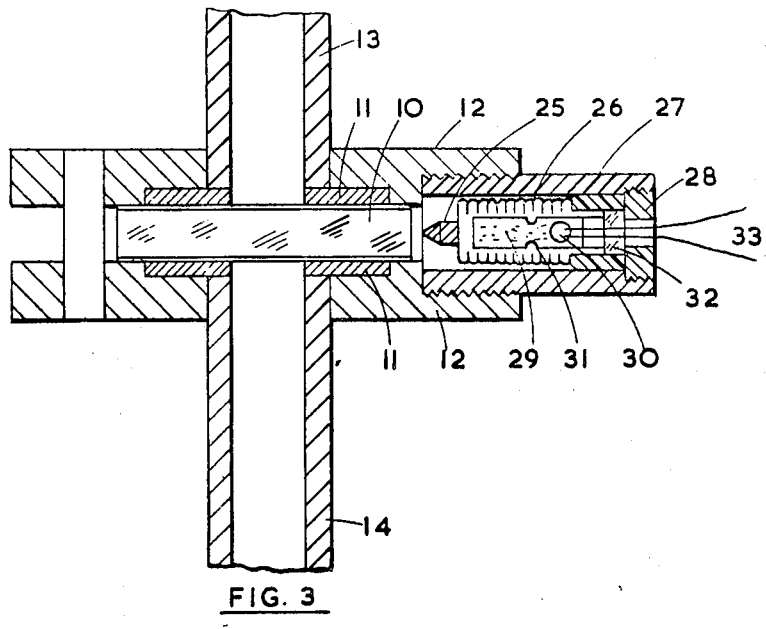
FIG. 3

BURSTING DISC ASSEMBLY

This invention relates to a frangible disc assembly, to vessels having an aperture sealed by the frangible disc assembly and to a method of opening quickly and completely an aperture sealed with toughened glass.

In certain applications, such as for example, in fire fighting and in the rapid activation of safety devices where a flexible container is required to be rapidly inflated, fluent material is stored in a container which can be opened quickly to dispense the material when required. Usually this dispersion is effected by rapid breaking of a portion of the container wall or rapid opening of an aperture which is sealed by a movable or rupturable member such as a bursting disc in the container wall.

Frangible discs have been made from many brittle materials, including toughened glass, and rapid actuators, including, for example, detonating explosive charges, have been used to shatter the glass. The frangible disc assemblies used hitherto have had one or more of the following disadvantages;

a. on activation they did not shatter evenly, completely and immediately;
b. they involved too many moving parts;
c. they involved explosive compounds which generated uncontrolled shockwaves and/or left undesirable residues.

It is an object of this invention to provide a frangible disc assembly which is free from these disadvantages.

It is a known characteristic that toughened glass will shatter rapidly and completely if the surface skin is pierced, the rate of disintegration being in some cases about 1700 meters per second. We have now found that toughened glass in a frangible disc assembly can be advantageously pierced by means of a spike driven against the surface under the influence of a gas under pressure such as may be produced from a pyrotechnic composition and confined entirely within the vessel in which it is generated.

From one aspect the invention consists in a frangible disc assembly comprising a frangible disc of toughened glass, a movable metal spike pointing towards the glass and gas supply means adapted on actuation to act on the spike and project it against the glass with sufficient force to rupture the surface layer thereof and consequently shatter the disc. The invention also includes vessels having an aperture sealed with this frangible disc assembly.

From a further aspect the invention consists in a method of opening an aperture sealed with toughened glass which comprises projecting a metal spike, under the impetus of pressurized gas, against the glass surface with sufficient force to rupture the surface and consequently shatter the disc.

The gas supply means is conveniently a fast-burning gas-producing pyrotechnic composition and ignition means therefor. In a preferred assembly which can be triggered electrically, for example from the electric signal generated by a fire detector, the ignition means is an electric fusehead. The usual fusehead comprises a bead of fast burning pyrotechnic composition surrounding a resistance wire element. Any of the well known fast-burning gas-producing pyrotechnic compositions, for example compositions containing lead dinitroresorcinate or lead styphnate, may conveniently be used.

The fast-burning gas-producing pyrotechnic composition is advantageously enclosed in a vessel, preferably of sufficient strength to contain the maximum pressure generated, and the movable spike is preferably connected to a movable wall-portion of a vessel into which the gas is introduced. This is preferably the same vessel wherein the gas is generated from the pyrotechnic composition. The movable wall-portion may, for example, be a piston slidably located in the vessel or a bellows member attached to the vessel.

The metal spike is preferably made of hardened steel and is preferably formed with a pointed, rounded or chisel edge. The spike may be arranged to strike the frangible disc on the face or edge but the direction of striking should preferably be at right angles to the glass surface.

The assembly is very readily installed for operation. The frangible disc may be mounted on a vessel by any of the usual methods, for example using a flange system, and the spike and its associated gas supply may be mounted in any convenient position over the surface of the glass.

The invention is further illustrated by the following description to two embodiments which are hereinafter described, by way of example only, with reference to the accompanying drawings wherein FIGS. 1 and 3 show diagrammatically in sectioned elevation two forms of bursting disc assembly.

FIG. 2 shows a section of part of FIG. 1 on a larger scale.

In the drawings, wherein like parts are represented by the same numeral, a frangible disc of toughened glass 10 is secured between gaskets 11 within flange coupling members 12 of two pipe sections 13, 14.

In the assembly shown in FIG. 1, a spike 15, integral with a piston 16 in cylinder 17, has a round pointed end directed through an aperture 18 in the gasket 11 towards the flat surface of glass disc 10. The cylinder 17 is secured in a hole in one of the flange coupling members and a charge of fast-burning gas-producing pyrotechnic composition 19 and an electric fusehead 20 are housed in a copper cup 21 inserted as a tight fit in the end of cylinder 17. A rubber O-ring seal 22 is located between the bottom of cup 21 and the piston 16 and the cylinder 17 is closed by a bonded glass plug 23 through which the electrical conducting wires 24 from the fusehead are led.

When the frangible disc is required to operate, the passage of electric current through the wires 24 fires the fusehead 20 which ignites the pyrotechnic composition 19. The gas pressure generated by the pyrotechnic composition 18 projects the cup 21 against piston 16 and spike 15 is projected against the glass disc 10 with sufficient force to pierce the surface layer. The glass disc 10 disintegrates rapidly. The generated gas is completely retained in the cylinder 17.

In the assembly shown in FIG. 3 a spike 25 integral with a phosphor bronze bellows 26 has a chisel edge adjacent to the edge of glass disc 10. The bellows 26 is housed in a metal tube 27 fixed between the flange coupling members 12 and retained by an end-ring 28 screwed into the end of tube 27. A charge of fast-burning gas-producing pyrotechnic composition 29 and an electric fusehead 30 sealed in a perforated tubular copper container 31 are located inside the bellows 26, and the bellows is closed tightly with a bonded glass plug 32. Electrical leading wires 33 from the fusehead are led from the fusehead 30 through end-plug 32 and end-ring 28. When the fusehead 28 is fired and the pyrotechnic composition 29 ignited, the gas generated rapidly expands the bellows 26. The spike 25 is projected against the edge of the glass disc 10, piercing the surface layer, and the glass disc disintegrates. The generated gas is completely retained in the bellows 26.

What we claim is:

1. A fast-acting fluid delivery system comprising
   a. two fluid conduits arranged for fluid delivery along a path therebetween,
   b. a frangible disc of glass, of the type which shatters rapidly and completely if the surface skin is pierced, said disc having two faces joined by a peripheral edge,
   c. means for mounting said frangible disc of glass directly between said fluid conduits so that a face of said disc prevents fluid delivery along said path,
   d. a movable spike pointing towards said frangible disc,
   e. gas supply means for providing gas to act upon said spike to force it against said disc to rupture the surface layer thereof thereby shattering said disc and allowing fluid delivery between said fluid conduits, along said path, and
   f. means for mounting said movable spike for movement against said disc along a path all of which lies fully outside said path of fluid delivery between said fluid conduits.

2. A fast-acting fluid delivery system as recited in claim 1 wherein said means for mounting said movable spike includes means for directing said movable spike against the edge of said disc.

3. A fast-acting fluid delivery system as recited in claim 1 wherein said means for mounting said frangible disc of glass directly between said fluid conduits includes gasket means associated with each said conduit.

4. A fast-acting fluid delivery system as recited in claim 1 wherein said gas supply means comprises a fast-burning gas-producing pyrotechnic composition with an electric fusehead ignition means therefore.

5. A fast-acting fluid delivery system as recited in claim 4 wherein said pyrotechnic composition is selected from the group consisting of lead dimitroresorcinate and lead styphnate.

6. A fast-acting fluid delivery system as recited in claim 4 wherein said pyrotechnic composition is completely contained, even after burning, in a vessel having a movable wall portion, and wherein said movable spike is connected to said movable wall portion.

7. A fast-acting fluid delivery system as recited in claim 6 wherein said movable wall portion of said vessel is provided by a piston slidably located in said vessel.

8. A fast-acting fluid delivery system as recited in claim 1 wherein said means for mounting said movable spike includes means for directing said movable spike against one face of said disc.

* * * * *